United States Patent [19]

Iida et al.

[11] Patent Number: 5,016,394
[45] Date of Patent: May 21, 1991

[54] GLASS RUNNER STRUCTURE OF AUTOMOTIVE DOOR

[75] Inventors: Nozomi Iida, Hadano; Shuichi Hannya, Chigasaki; Kazuaki Omote, Isehara, all of Japan

[73] Assignee: Nissan Motor Co., Ltd., Yokohama, Japan

[21] Appl. No.: 456,696

[22] Filed: Dec. 26, 1989

[30] Foreign Application Priority Data

Dec. 27, 1988 [JP] Japan .................. 63-329793

[51] Int. Cl.$^5$ ................................. E06B 7/22
[52] U.S. Cl. ............................ 49/441; 49/482; 49/489
[58] Field of Search ............. 49/440, 441, 488, 489, 49/490, 482

[56] References Cited

U.S. PATENT DOCUMENTS

| | | | |
|---|---|---|---|
| 4,381,115 | 4/1983 | Ko | 49/489 X |
| 4,455,785 | 6/1984 | Wahr et al. | 49/488 |
| 4,604,830 | 8/1986 | Maeda et al. | 49/440 X |
| 4,614,061 | 9/1986 | Brocke | 49/489 X |
| 4,656,784 | 4/1987 | Brachmann | 49/441 X |
| 4,756,944 | 7/1988 | Kisanuki | 49/490 X |
| 4,843,759 | 7/1989 | Kisanuke et al. | 49/490 X |

FOREIGN PATENT DOCUMENTS

| | | | |
|---|---|---|---|
| 192637 | 11/1984 | Japan | 49/490 |
| 63-172717 | 9/1988 | Japan | |
| 306917 | 12/1988 | Japan | 49/488 |

Primary Examiner—Rodney M. Lindsey
Assistant Examiner—Jerry Redman
Attorney, Agent, or Firm—Pennie & Edmonds

[57] ABSTRACT

A glass runner structure is disclosed, which is disposed on an outer surface of an automotive door sash for guiding upward and downward movements of a window glass over the door sash. The structure comprises an elongate base portion of solid rubber which extends along the automotive door sash and is secured to the outer surface of the sash. An elongate outer wall portion is integral with the base portion, the outer wall portion projecting downward from an outside part of the base portion thereby to define a guide groove between the outer wall portion and the base portion. An elongate lip portion integral with the elongate outer wall portion extends downward from the same. A bridge portion of a flexible material spans between the outer wall portion and the base portion adjacent the elongated lip portion. When the window glass is moved upward and an upper edge thereof flexes the bridge portion upward, the lip portion moves toward an outer surface of the window glass and sealingly contacts the outer surface of the window glass.

8 Claims, 2 Drawing Sheets

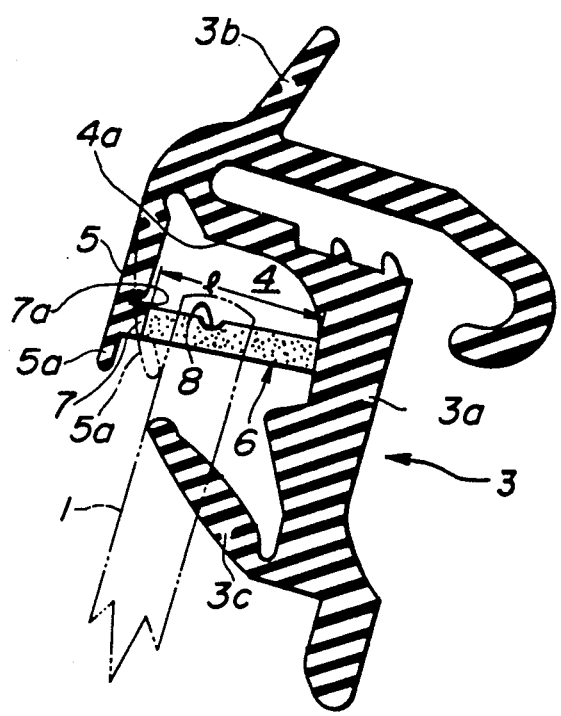
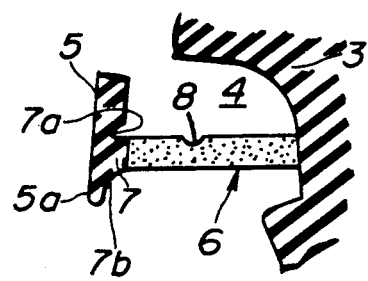
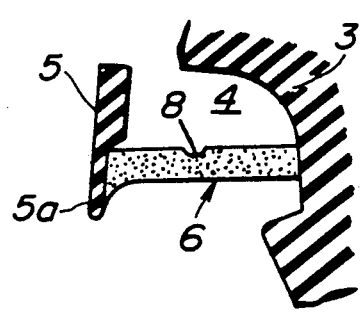
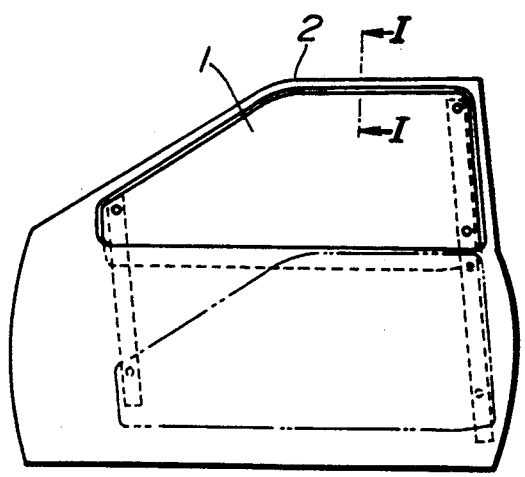

GLASS RUNNER STRUCTURE OF AUTOMOTIVE DOOR

BACKGROUND OF THE INVENTION

1. Field of the Invention

The present invention relates in general to a glass runner structure of automotive sashed doors, and more particularly to a glass runner structure applied to doors of a so-called "hidden sash" type.

2. Description of the Prior Art

In Japanese Utility Model First Provisional Publication 63-172717, there is shown a glass runner structure applied to hidden sash type doors. The doors of this type are suited for a flush-surface vehicle body, which have such a construction that a door window glass is arranged to slide over an outer surface of the door sash with the glass runner structure interposed therebetween.

The glass runner structure of the publication is constructed of solid rubber and has a guide groove in and along which a periphery of the window glass slides. The guide groove has, at a portion against which an upper edge of the window glass abuts upon full closing of the window glass, a bridge portion of sponge rubber which spans between opposed (viz., inside and outside) walls of the guide groove at a short distance from the bottom of the groove. When the window glass is raised up to its uppermost closed position, the upper edge of the window glass presses up and thus flexes the bridge portion. With this, the upper edge of the window glass can be sealed by the sponge bridge portion. In addition to this, a shock produced when the window glass reaches the fully closed position can be softened.

However, due to its inherent construction, the glass runner structure has the following drawbacks.

That is, upon the window glass reaching the fully closed position, there remains a marked parting clearance between the outside wall of the guide groove and the window glass, which makes the external appearance and the aerodynamic performance of the vehicle poor. Furthermore, because of the clearance, the sponge bridge portion is easily attacked by water particularly when the vehicle is subjected to a high pressure water car washing. Such water attack tends to cause undesirable water leakage through the glass runner structure.

SUMMARY OF THE INVENTION

It is therefore an object of the present invention to provide a glass runner structure of an automotive door, which is free of the above-mentioned drawbacks.

According to the present invention, there is provided a glass runner structure which is so constructed that when the window glass is raised up to the fully closed position pressing a bridge portion, the outside wall of the guide groove is flexed by such a degree that a lip of the outside wall becomes into intimate contact with the window glass thereby to eliminate the undesirable parting clearance.

According to the present invention, there is provided, in a glass runner structure disposed on an outer surface of an automotive door sash for guiding upward and downward movements of a window glass over the door sash, a combination which comprises an elongate base portion of solid rubber extending along the automotive door sash and secured to the outer surface of the sash; an elongate outer wall portion integral with the base portion, the outer wall portion projecting downward from an outside part of the base portion thereby to define a guide groove between the outer wall portion and the base portion; an elongate lip portion integral with the elongate outer wall portion and extending downward from the same; a bridge portion constructed of a flexible material, the bridge portion spanning between the outer wall portion and the base portion at a short distance from a bottom of the guide groove; and means for flexing the outer wall portion to such a degree that the lip portion contacts an outer surface of the window glass when the bridge portion is flexed by the window glass.

BRIEF DESCRIPTION OF THE DRAWINGS

Other objects and advantages of the present invention will become apparent from the following description when, taken in conjunction with the accompanying drawings, in which:

FIG. 2 is an enlarged sectional view of the glass runner structure of the first embodiment;

FIG. 3 is a partial sectional view of a glass runner structure of a second embodiment of the present invention;

FIG. 4 is a view similar to FIG. 3, but showing a glass runner structure of a third embodiment; and FIG. 5 is a side view of an automotive door to which the present invention is practically applied.

DETAILED DESCRIPTION OF THE INVENTION

Figure 1:
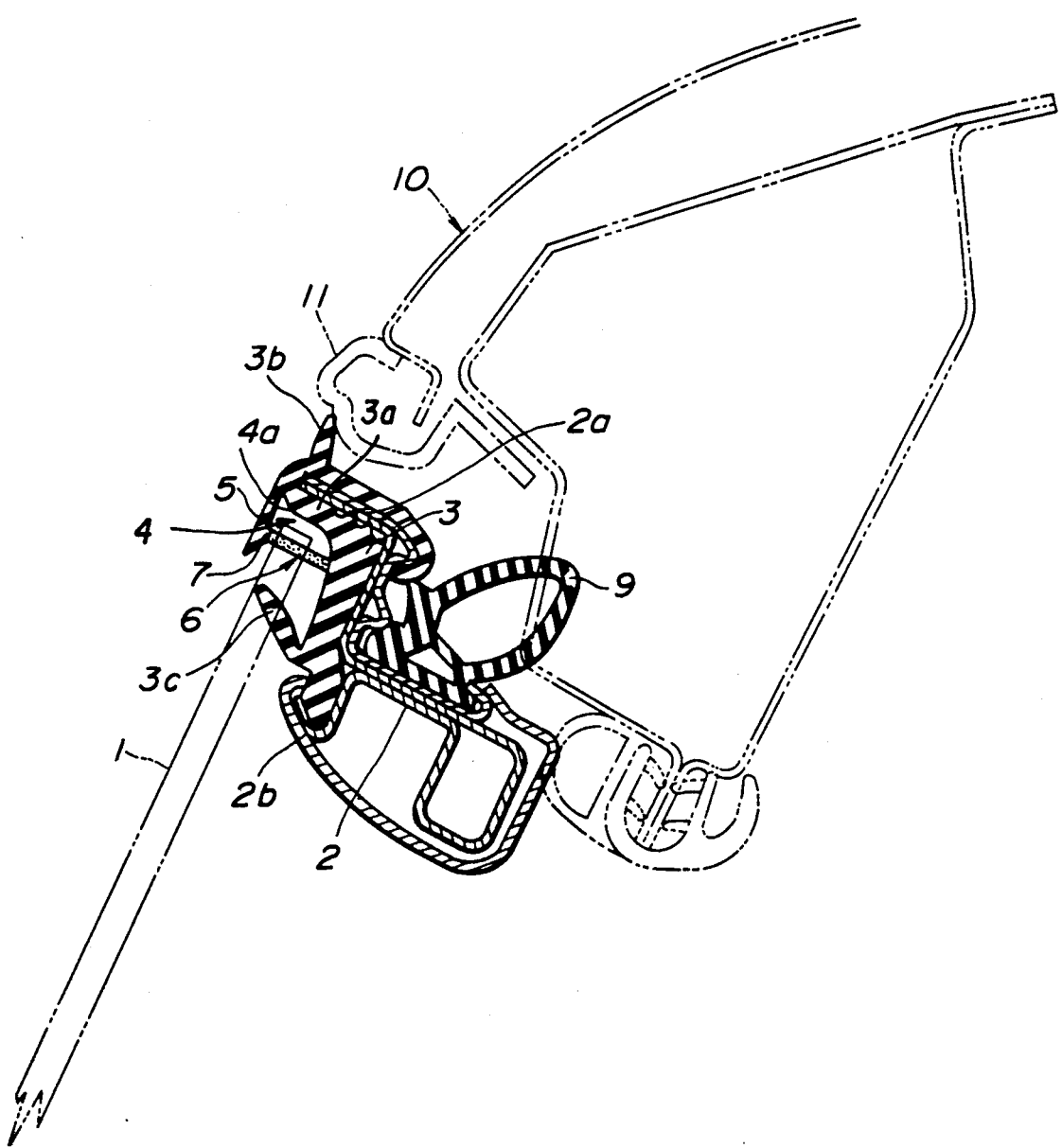
FIG. 1 is a partial sectional view of a seal construction of an automotive door to which a glass runner structure of a first embodiment of the present invention is applied, which view corresponds to a sectional view taken along the line I—I of FIG. 5.

Referring to FIGS. 1 and 2, there is shown a glass runner structure of a first embodiment of the present invention, which is applied to a sash hidden type automotive door as shown in FIG. 5.

As is seen from FIGS. 1 and 5, the door comprises a door sash 2 which is mounted on a door proper and a window glass 1 which is vertically movably supported by the door. The door sash 2 mounts thereon a weather strip 9 having a known structure. Designated by numeral 10 is a roof of an associated motor vehicle, which defines an upper periphery of a door opening for the door. Another weather strip 11 extends along the periphery of the door opening and is secured thereto.

Similar to the case of the afore-mentioned hidden sash type glass runner structure, the window glass 1 is arranged to slide over an outer surface of the door sash 2 with an improved glass runner structure 3 interposed therebetween, as is understood from FIG. 1.

The glass runner structure 3 is constructed of a solid rubber and shaped to match the door sash 2. Thus, as is understood from FIG. 5, the glass runner structure 3 includes front and rear upstanding portions and an upper portion 3a which are united to form an arch-shaped construction.

As is understood from FIGS. 1 and 2, in order to guide the upward and downward movements of the window glass 1, the glass runner structure 3 is formed with a guide groove 4 which extends therearound. The guide groove 4 thus includes front and rear upstanding portions and an upper portion 4a, matching the arch-like shape of the glass runner structure 3. During the upward and downward movements of the window glass 1, front and rear edges of the same are slidably guided by the front and rear upstanding portions of the guide groove 4. Upon the window glass 1 reaching its uppermost or fully closed position, an upper edge of the glass 1 is received in the upper portion 4a of the guide groove 4.

As is shown in FIGS. 1 and 2, the upper portion 3a of the glass runner structure 3 comprises a longitudinally extending base part which has upper and lower portions held by respective flanges 2a and 2b of the door sash 2, a longitudinally extending first lip 3b which projects upward from the base part, a longitudinally extending second lip 3c which projects outwardly from the lower portion of the base part and a longitudinally extending outer wall 5 which projects downwardly from the upper portion of the base part. It is thus to be noted that the outer wall 5 constitutes one of the opposed walls by and between which the guide groove 4a is defined.

Similar to the case of the afore-mentioned conventional one, the upper portion 4a of the guide groove 4 has a bridge portion of sponge rubber which spans between the opposed walls of the guide groove 4a at a short distance from the bottom of the groove 4a.

In the present invention, the following unique measure is employed.

As is best shown in FIG. 2, the outer wall 5 of the glass runner structure 3 is formed, at the portion to which the sponge bridge portion 6 is connected, with a longitudinally extending ridge 7 which is integral with the outer wall 5. The outer wall 5 has near the ridge 7 a longitudinally extending channel 7a for characterizing the ridge 7. It is thus to be appreciated that the length "l" of the sponge bridge portion 6 is reduced by a length corresponding to the length (or height) of the ridge 7. The outer wall 5 has a longitudinally extending lip 5a which projects downward, as shown. The thickness of the lip 5a is smaller than that of the outer wall 5.

When the window glass 1 is raised up to the fully closed position, the sponge bridge portion 6 is pressed or flexed upward by the upper edge of the window glass 1 thereby pulling or inclining the outer wall 5 of the glass runner structure 3 toward the window glass 1.

Because the length of the sponge bridge portion 6 is reduced by a certain degree as has been mentioned hereinabove, the flexion of the sponge bridge portion 6 induces a greater inclination of the outer wall 5 than that in the conventional one, as will be understood from the position of the lip 5a illustrated by a phantom line in FIG. 2. Furthermore, because the ridge 7 is made of the solid rubber, the flexion of the sponge bridge portion 6 is instantly transmitted to the outer wall 5. Accordingly, upon the window glass 1 reaching the fully closed position, the lip 5a of the glass runner structure 3 comes into intimate contact with the window glass 1, as is shown by the phantom line in FIG. 2. Accordingly, the aforementioned undesirable parting clearance is not produced in the present invention.

As is shown in FIG. 2, if desired, the sponge bridge portion 6 may be formed with a depression 8. With this, the flexure of the sponge bridge portion 6 can be increased.

Referring to FIG. 3, there is shown a glass runner structure 3 which is a second embodiment of the present invention. In this embodiment, the ridge 7 and the lip 5a are connected through a smoothly curved junction portion 7b. With this, the connecting portion between the sponge bridge portion 6 and the outer wall 5 is increased in the sectional area, and thus the inclining movement of the outer wall 5 toward the window glass 1 is much assured.

Referring to FIG. 4, there is shown a glass runner structure 3 which is a third embodiment of the present invention. In this embodiment, means corresponding to the ridge 7 of the first and second embodiments is not provided. But, in the third embodiment, a relatively long sponge bridge portion 6 is used, which has an enlarged end secured to the lip 5a of the outer wall 5. Because of increase in connecting area between the bridge portion 6 and the wall portion 5, an advantageous effect similar to that of the second embodiment is also obtained.

What is claimed is:

1. In a glass runner structure disposed on an outer surface of an automotive door sash for guiding upward and downward movements of a window glass over said door sash, comprising:
    an elongate base portion of solid rubber extending along said automotive door sash and secured to said outer surface of said sash;
    an elongate outer wall portion integral with said base portion, said outer wall portion projecting downward from an outermost portion of said base portion thereby to define a guide groove between said outer wall portion and said base portion;
    an elongate lip portion integral with said elongate outer wall portion and extending downward from the same;
    a bridge portion constructed of a flexible material, said bridge portion spanning between said outer wall portion and said base portion adjacent said elongate lip portion; and
    a longitudinally extending ridge integrally formed on said outer wall portion and projecting toward said guide groove, said ridge having one end of said bridge portion fixed thereto,
    whereby said outer wall portion and said lip flex toward an outer surface of said window glass to cause said lip portion to contact said outer surface of said window glass when an uppermost edge of said window glass flexes said bridge portion upwardly.

2. A glass runner structure as claimed in claim 1, in which said bridge portion is constructed of sponge rubber and formed with a depression for increasing the flexibility of said bridge portion.

3. A glass runner structure as claimed in claim 1, in which a longitudinally extending channel is formed on said outer wall portion adjacent said ridge.

4. A glass runner structure as claimed in claim 3, in which said ridge and said lip portion are integrally connected through a smoothly curved junction portion.

5. A glass runner structure as claimed in claim 4, in which said lip portion has a thickness smaller than that of said outer wall portion.

6. A glass runner structure as claimed in claim 5, in which said bridge portion is formed with a recess for increasing the flexibility of said bridge portion.

7. A glass runner structure as claimed in claim 1, in which said bridge portion comprises an enlarged end portion which forms said ridge portion and fixed to said lip portion.

8. A glass runner structure as claimed in claim 7, in which said bridge portion is formed with a depression for increasing the flexibility of said bridge portion.

* * * * *